United States Patent [19]

Lee

[11] 4,323,835

[45] Apr. 6, 1982

[54] SIMPLIFIED POWER FACTOR CONTROLLER FOR INDUCTION MOTOR

[75] Inventor: Maw H. Lee, Broadview Hts., Ohio

[73] Assignee: The Scott & Fetzer Company, Cleveland, Ohio

[21] Appl. No.: 127,439

[22] Filed: Mar. 5, 1980

[51] Int. Cl.$^3$ ............................................. H02P 7/36
[52] U.S. Cl. ................................... 318/729; 318/809; 318/812
[58] Field of Search ....................... 318/729, 798–800, 318/805, 809, 812, 245, 345, 331

[56] References Cited

U.S. PATENT DOCUMENTS

| | | | |
|---|---|---|---|
| 3,443,188 | 5/1969 | Mortimer | 318/345 |
| 3,477,003 | 11/1969 | Kato | 318/812 |
| 3,588,647 | 6/1971 | Harwell | 318/245 |
| 3,596,158 | 7/1971 | Watrous | 318/809 |
| 4,052,648 | 10/1977 | Nola | 318/729 |

Primary Examiner—J. V. Truhe
Assistant Examiner—Eugene S. Indyk
Attorney, Agent, or Firm—Pearne, Gordon, Sessions, McCoy & Granger

[57] ABSTRACT

A phase-triggered, gate-controlled AC semiconductor switch, in series with an induction motor and its AC supply, optimizes power flow to the motor under changing mechanical load conditions by varying the amount of supply voltage applied to the motor over each half-cycle of the AC supply. Such power flow optimization is effected by utilization of a control voltage generated by the freewheeling induction motor during nonconduction periods of the switch. The triggering point of the switch relative to the preceding zero crossing point of the supply voltage, that is, the switch firing angle or delay angle, is varied by the control voltage augmenting to a varying degree the charging rate of a capacitor that triggers the semiconductor switch into conduction. Under increasing mechanical load conditions, the control voltage decreases, the decreased control voltage accelerating the charging rate of the capacitor to trigger the switch into conduction at a reduced firing angle, wherein power flow to the motor is increased. Conversely, under decreasing mechanical load conditions, the control voltage increases, the increased control voltage decelerating the charging rate of the capacitor to trigger the switch into conduction at an increased firing angle, wherein losses caused by reactive current in the less-than-fully loaded induction motor are reduced with a resultant optimization of power factor.

15 Claims, 10 Drawing Figures

SIMPLIFIED POWER FACTOR CONTROLLER FOR INDUCTION MOTOR

BACKGROUND OF INVENTION

The present invention relates to electronic controllers for motors adapted to drive varying or less than full mechanical loads, and more particularly, to control circuits for automatically reducing the power applied to a less-than-fully-loaded AC induction motor, such reduced power application reducing losses caused by reactive current to improve the power factor of the induction motor.

U.S. Pat. No. 4,052,648 to Nola discloses an AC induction motor control circuit of the subject type which utilizes a thyristor means such as a Triac switch (TRIAC is a trademark of The General Electric Company of Syracuse, N.Y.) in series with an induction motor to lessen the time of supply voltage application to the motor, on a half-cycle basis, the time of supply voltage application being inversely proportional to the power factor (greater current lag with lessening mechanical load) which is sensed by load voltage and load current sampling. In effect, Nola continuously senses the phase angle between the load voltage and load current, and then uses a phase angle-related signal to continuously adjust the firing point of the Triac switch relative to the zero crossing point of the line voltage. For a sensed increasing phase angle (decreasing power factor) between load voltage and load current, Nola shifts the Triac switch firing point away from the line voltage zero crossing point to apply a smaller portion of each half-cycle of the line voltage, which inherently decreases the phase angle (increasing power factor) and reduces the heat loss ($I^2R$) caused by the reactive current.

While Nola recognizes the energy-saving advantages of duty cycle controlling an induction motor as a function of its load with a series-inserted, phase-triggered Triac switch, his phase angle measuring requirement and the resultant circuitry are undesirably complex and costly as compared to the relative simplicity and low cost of a small, single phase induction motor which exhibits the greatest need for reliable power factor regulation.

U.S. application Ser. No. 042,608, filed May 25, 1979, by the inventor in the present application discloses an electronic controller which senses load current only in providing effective power factor control of an induction motor. While this current sensing only controller represents a substantial improvement over the earlier-discussed Nola device, it still requires a considerable number of components, resulting in costs which detract from its advantages in some applications.

SUMMARY OF THE INVENTION

In accordance with the present invention, in a circuit including an induction motor periodically energized at a predetermined frequency by a power supply to maintain the motor's speed under changing mechanical load conditions, means and method are provided for varying the period of energization of the motor in accordance with a mechanical load indicative control signal generated by the motor between the periods of energization, wherein the power factor of the motor is optimized over the range of changing mechanical load conditions.

For example, to provide such power regulation, the duration of conduction periods of a motor energizing semiconductor switch in series with the motor is varied in accordance with the amplitude of a control voltage generated by the motor during non-conduction periods of the semiconductor switch when the rotor of the motor is freewheeling, the amplitude of the control voltage varying as a function of mechanical loading on the rotating rotor shaft of the motor. Such a control scheme effectively varies the duty cycle of the motor as a function of its mechanical loading to optimize its power factor by supplying only enough power to the motor to maintain its speed and required torque.

Continuous triggering of the semiconductor switch is provided under full load conditions to latch the switch in a conducting state for full supply voltage application to the motor.

BRIEF DESCRIPTION OF THE DRAWINGS

Other objects and a fuller understanding of the invention may be had by referring to the following description and claims, taken in conjunction with the accompanying drawings.

DETAILED DESCRIPTION OF THE PREFERRED EMBODIMENTS

Figure 1:
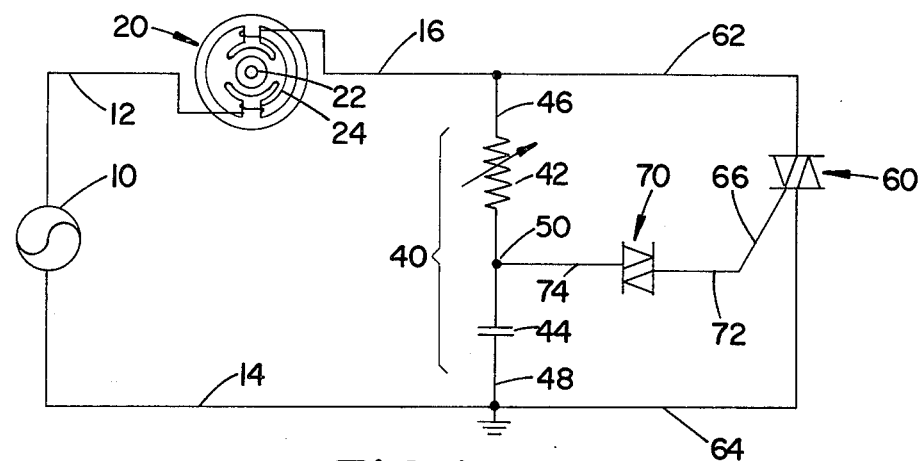
FIG. 1 is a schematic diagram of a circuit incorporating the present invention.

It is known in the art that the power factor of an induction motor can be optimized or maximized to save electrical energy by applying to the motor less than full line voltage when the motor is in an idling or lightly loaded state. U.S. Pat. No. 4,052,648 to Nola, incorporated herein in its entirety by reference, teaches a particular control scheme for providing such reduced power to the induction motor wherein a series-inserted Triac switch between the motor and its AC supply is phase-triggered relative to the zero crossing point of the supply voltage to apply more or less voltage on a half-cycle basis to the motor as a function of mechanical loading thereon. The motor is periodically energized for a load dependent time duration at a predetermined frequency (e.g., 120 Hz in Nola; i.e., the half-cycle frequency of standard line voltage is 120 Hz) to maintain its speed and torque requirements under changing mechanical load conditions. A larger portion of each half cycle of the line voltage is applied to the motor undergoing an increasing mechanical load (high duty cycle), while a smaller portion of each half cycle of the line voltage is applied to the motor undergoing a decreasing mechanical load (low duty cycle). It is to this general duty-cycling type of control scheme using a phase-triggered semiconductor switch as taught by Nola that the present invention is directed.

The present invention lies in part in the utilization of the discovery that a conventional induction motor generates a voltage while it is freewheeling or coasting during nonconducting states of a phase-triggered semiconductor switch duty-cycle controlling it and of the further discovery that such motor generated "freewheeling voltage" is a mechanical load indicative signal. This motor-generated voltage exists subsequent to the trailing edge of the load current pulses through the motor, the amplitude of such voltage varying as a function of mechanical loading on the freewheeling rotor shaft of the motor. The variance of the amplitude of the motor-generated control voltage over a range of mechanical loads provides useful information that is utilized in a power factor optimizing feedback control system to vary the duration of the conduction period of the semiconductor switch, and thus the period of energization of the motor, as a function of mechanical loading on its rotor shaft.

It is not known whether the existence of the above referred to motor generated "freewheeling voltage" has been previously recognized. Whether or not there has been any such previous recognition, it is believed that the significance of the "freewheeling voltage" as a useful signal has heretobefore been unrecognized in the art. While the phenomenon of such voltage generation by a freewheeling induction motor is not fully understood, it is believed to be caused by the rotation of a heretofore unrecognized induced magnetic field carried for a time period (e.g., 5 msec.) by the induction motor rotor. It is believed that such a magnetic field is created by circulating rotor currents induced by the collapsing stator field resulting from the immediately preceding load current pulse through the motor stator.

It is believed that, with the rotor of the motor freewheeling, the induced magnetic field carried by the rotor of the motor cuts the stator windings to provide the control voltage utilized in the present invention as a control signal to optimize the power factor of the motor by varying the conduction period of the motor energizing semiconductor switch.

It is further believed that the relatively long time period or duration (e.g., 5 msec.) of the induced magnetic field carried by the freewheeling motor rotor is due to the high inductance L and the low resistance R of the single turn rotor conductor, such high inductance and low resistance providing a relatively long time constant to retard the decay of the induced magnetic field once established about the rotor. It is further noted that the motor-generated control voltage is of an opposite voltage polarity relative to the supply voltage providing the immediately preceding load current pulse to the motor stator. That is, the motor-generated control voltage as utilized in the present invention appears as a counter EMF type voltage relative to the AC supply voltage applied to the motor. It has also been found that a lightly loaded, freewheeling induction motor rotor provides a control voltage having an amplitude greater than that generated by the motor when its freewheeling shaft is more heavily loaded.

Although to a degree conjectural, the theories given above, when considered along with the above noted observations, are believed to offer a plausible explanation for the successful operation of the circuit embodiments discussed below.

With particular reference to FIG. 1 of the drawings, there is disclosed a single-phase circuit including a standard 110 or 220-volt, 60-Hertz AC supply 10 functioning as a power source to periodically energize a conventional, fractional horsepower, AC induction motor 20 of, for example, the capacitor start, squirrel-cage type.

The motor 20 includes a stator winding 24 and a rotatable rotor having a rotor shaft 22 for driving a changing or less than full mechanical load placing varying torque requirements on the motor 20. As illustrated in FIG. 1, the supply 10 provides a non-grounded or high side power line 12 constituting a first motor power lead which is connected to one side of the stator winding 24, while the other side of the stator winding 24 is connected to a second motor power lead 16. The supply 10 also provides a neutral or low side power line 14 which is connected to the second motor power input lead 16 via gate-controlled AC semiconductor switch in a preferred form of an AC thyristor means, such as a Triac switch 60.

The Triac switch 60 includes a first thyristor power lead 62 connected to the second motor power input lead 16 and a second thyristor power lead 64 connected to the neutral power line 14. When the Triac switch 60 is in a fully conducting condition, load current flows through the electrically series-connected supply 10, motor 20, and Triac switch 60, wherein the motor 20 is energized. Under these conditions, essentially all of the supply voltage is dropped across the motor 20, since the fully conducting Triac switch 60 exhibits a very low impedance.

To effectively duty-cycle control the motor 20 to optimize its power factor in accordance with the general teachings of the earlier-noted Nola patent, an RC network 40 is connected in electrical parallel relation across series-connected supply 10 and the motor 20, as illustrated. It can be seen that the network 40 is also electrically connected in parallel relative to the Triac switch 60. The network 40 includes a time constant determining resistor 42, of, for example, 50 kilo ohms, and a Triac switch triggering capacitor 44, of, for example, 1 microFarad, connected in electrical series relation relative to each other, one end 46 of the resistor being connected to the second motor power input lead 16 and one end 48 of the capacitor 44 being connected to the neutral power line 14. Further, the other ends of the resistor 42 and the capacitor 44 are connected together to establish an RC network midpoint 50 providing a voltage for triggering the Triac switch 60 into a conducting condition.

A two-lead AC semiconductor switch 70, such as a Diac switch (Diac is a trademark of The General Electric Company of Syracuse, N.Y.) is connected between the RC network midpoint 50 and a gate electrode 66 of the Triac switch 60.

It is to be noted that the arrangement of the Triac switch 60, the Diac 70, the resistor 42, and the capacitor 44 as interconnected in the illustrated circuit resembles the arrangement of like elements that is well known in the art for regulating power applied to an incandescent lamp dimmer, the lamp functioning in such prior art arrangements as a resistive load in place of the induction motor 20. An important aspect of the present invention is the discovery that a circuit which resembles a known circuit for controlling a resistive load, such as an incandescent lamp, can be utilized to optimize the power factor of a conventional induction motor by exploiting the newly appreciated phenomenon noted above wherein a mechanical load indicative voltage signal is generated by the motor when in a freewheeling condition subsequent to a load current pulse through the motor.

The operation of the induction motor control circuit of FIG. 1 will now be discussed. Initially, it is to be noted that the time constant determining resistor 42 is of a relatively high ohm value (e.g., 50K) relative to the impedance of the fully conducting Triac switch 60 such that essentially all load current flow in the circuit is through the series-connected supply 10, motor 20, and Triac switch 60. In accordance with well known principles, the Triac switch 60, which is a thyristor type semiconductor switch means, will recover to a nonconducting condition generally at the trailing edge of a load current pulse through the motor when the current through the Triac switch 60 drops below its specified "holding current", the trailing edge being generally located near, but subsequent in time to, the zero crossing point of the AC supply voltage due to the current lag effect caused by the inductive load in the form of the motor 20. The Triac switch 60 will remain in a nonconducting condition to preclude the application of supply voltage to the motor 10 until an appropriate gate signal is supplied at the gate electrode 66. Such a gate signal to trigger the Triac switch 60 into a conducting condition is provided in a known manner by the two-lead AC switch 70 having one of its leads 72 connected to the gate electrode 66 of the Triac switch 60 and having its other lead 74 connected to the RC network midpoint 50.

When the Triac switch 60 establishes a nonconducting condition, the difference between the supply voltage and the motor-generated voltage provided by the freewheeling motor 20 as discussed earlier serves to charge the RC network 40. When the RC network midpoint 50 reaches a predetermined voltage of either polarity in accordance with the RC time constant of the network 40 and the charging source applied to it, the two-lead Diac switch 70 will break down or fire feed current into or pull current out of the gate electrode 66 to rapidly trigger the Triac switch 60 into a conducting condition. The rate at which the capacitor 44 of the RC network 40 charges is dependent upon the voltage of the supply 10 and the control voltage generated by the motor 20, since the supply 10, the motor 20, and the network 40 constitute a Kirchoff loop, i.e., the voltage across the RC network 40 (and across the parallel connected nonconducting Triac switch 60) is the difference around the Kirchoff loop of the supply voltage 10 and the motor-generated control voltage provided by the freewheeling induction motor 20.

Figure 4:
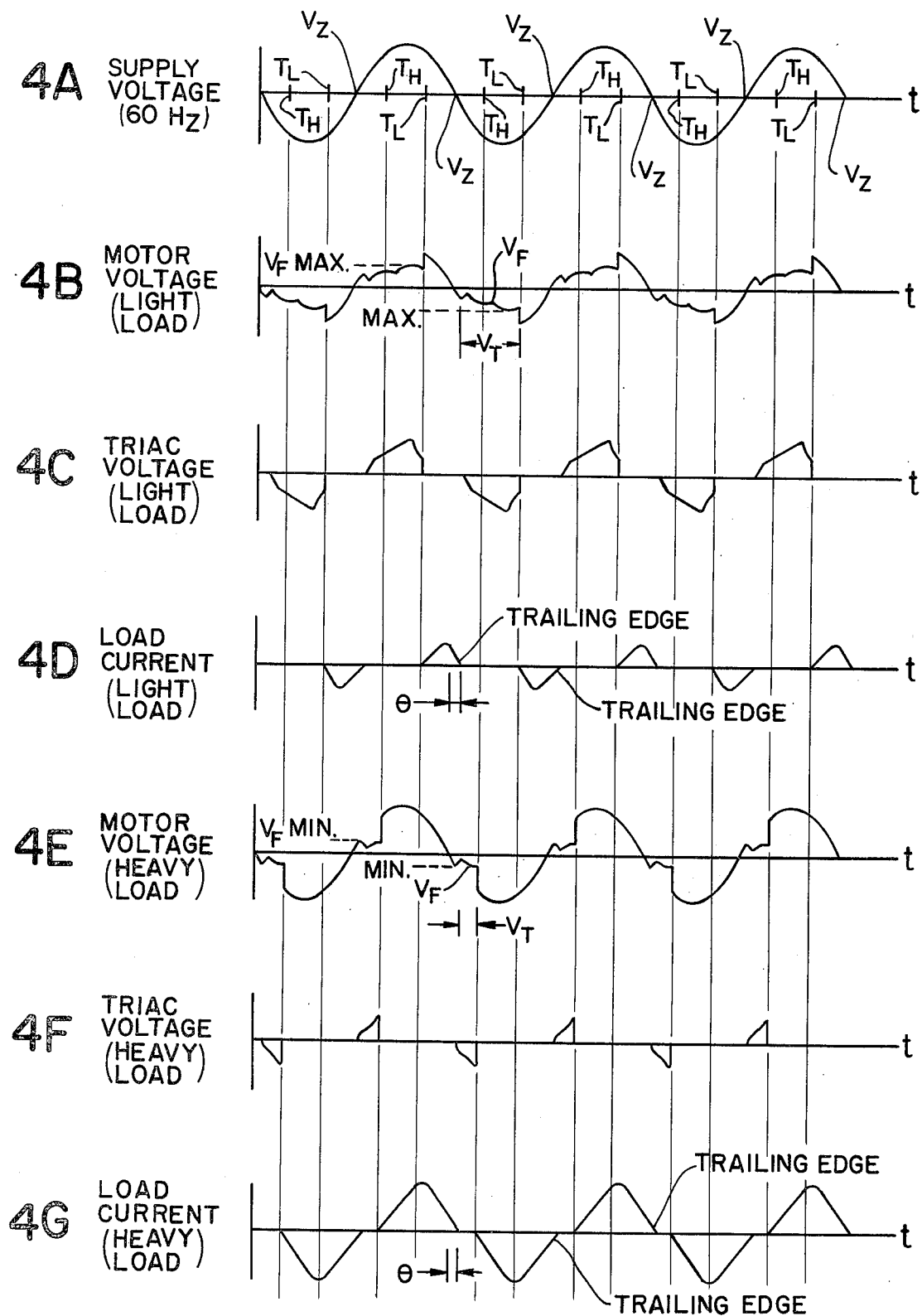
FIGS. 4A–4G are graphical representations of various voltages and currents exemplifying the operation of the circuits illustrated in FIGS. 1, 2, and 3.

Turning to FIG. 4, there are illustrated on a common time axis various voltages and currents exemplifying the operation of the circuit of FIG. 1. Waveform 4A of FIG. 4 illustrates, as a function of time, the sine wave supply voltage provided by the conventional single phase 60 Hz AC supply 10. For each full cycle or period (approximately 16.7 msec) of the 60 Hz supply voltage, there exists a pair of zero crossing points $V_z$ wherein the supply voltage is instantaneously equal to zero. At some short interval past (i.e., when lagging load current decreases below "holding" current of Triac switch 60), the thyristor-type Triac switch 60, recovers in a known manner to a nonconducting condition provided no gate signal is being applied to it. To regulate the amount of supply voltage applied to the motor 20 as a function of mechanical loading thereon, so as to optimize its power factor, the Triac switch is triggered under light load conditions at, for example, times $T_L$, as illustrated in waveform 4A, times $T_L$ occur later in each half-cycle period or duration (approximately 8.3 msec) of the supply voltage, relative to, for example, times $T_H$, to effectively reduce the amount of supply voltage application to the motor (low duty cycle). While the frequency (120 Hz of half-cycle power application to the motor remains constant, the duration of power application periods is small (e.g., 2.7 msec). Such a reduced application of supply voltage effectively optimizes the motor power factor to minimize the phase angle of the lagging load current therethrough. Under heavier mechanical load conditions when more power application to the motor is desirable to maintain its speed and torque requirements, the Triac switch 60 is triggered into conduction at, for example, times $T_H$, as illustrated in waveform 4A, to apply more (e.g., 5.6 msec) of a half-cycle period (e.g., 8.3 msec) of the supply voltage to the motor (higher duty cycle). This control technique is known to inherently optimize the power factor of the motor and effectively reduce reactive current in the motor so as to minimize $I^2R$ losses.

Turning to waveform 4B, there is illustrated the voltage across the motor 20 of FIG. 1 under a light mechanical load condition (Triac switch 60 being triggered into conduction at time $T_L$) as a function of time relative to the supply voltage illustrated in waveform 4A. Under these light load conditions, only a small portion of each half-cycle of the supply voltage is applied to the motor 20. For most of the half-cycle period of the supply voltage the rotor of the induction motor is freewheeling and, as noted earlier, the motor 20 will generate a control voltage $V_F$ having an amplitude $V_{F\,max}$ existing over a time period $V_T$ approximately equal to the nonconduction time period of the Triac switch 60.

With reference to waveform 4C, the voltage across the nonconducting Triac switch 60, i.e., the voltage across the Triac switch power leads 60, 64, and necessarily across the RC network 40 in parallel with it, is equal to the difference between the supply voltage and the control voltage $V_F$. It is to be noted that while the voltages of waveform 4B are conventionally illustrated as being of the same polarity as the corresponding supply voltage of the waveform of FIG. 4A, in fact, from a Kirchoff loop standpoint (series loop including the supply 10, the motor 20, and the network 40), the voltage polarity of the supply at the time of the control voltage $V_F$ generation by the motor 20 is opposite thereto such that the voltage across the network 40 is the difference between the supply voltage and the control voltage $V_F$ over time $V_T$. It can be seen that for an increased amplitude of the control voltage $V_F$ the differential voltage applied across the RC network 40 will be less than in the case where the control voltage $V_F$ is small. Thus, for a large amplitude control voltage $V_F$ the charging voltage across the network 40 will be small to effectively fire the Triac switch 60 at a point later in time, (e.g., at times $T_L$) relative to the zero crossing point $V_z$ of the supply voltage, i.e., the rate of charging of capacitor 44 is retarded for a large control voltage $V_F$ generated by the lightly loaded motor 20 while the charging rate of the capacitor 44 would be accelerated for a smaller control voltage $V_F$ generated by a more heavily loaded motor 20, such accelerated charging firing the Triac switch 60 at a point in time earlier (e.g., at times $T_H$) in each half-cycle of the supply voltage. It can be seen that the control voltage $V_F$ continuously acts to adjust the firing angle of the Triac switch 60 to automatically apply more or less power to the motor 20 as a function of the mechanical load thereon to effectively maintain an acceptable load current-lagging phase angle $\theta$. This phase angle is illustrated relative to the minimum time duration load current pulses (120 Hz) through a lightly loaded motor as shown in waveform 4D.

Turning to waveforms 4E, 4F, and 4G, there is illustrated waveforms corresponding to waveforms 4B, 4C and 4D wherein the motor is under a heavier load with the Triac switch 60 now being triggered into conduction at time $T_H$ as discussed earlier with regard to waveform 4A.

Waveform 4E, in comparison to waveform 4B, shows that the amplitude $V_{F\,min}$ of the motor-generated control voltage $V_F$ is substantialy reduced. Such a reduction in the control voltage amplitude effectively applies more voltage to the RC network 40 to accelerate the charging of the capacitor 44, and hence fire the Triac switch 60 at an earlier point in time relative to the zero crossing point $V_z$ of the supply voltage. As illustrated in waveform 4F, the Triac switch voltage (i.e., the voltage across network 40 of FIG. 1) is the difference of the reduced amplitude control voltage $V_F$ of waveform 4D, and that portion of the supply voltage between the zero crossing point $V_z$ and the Triac switch triggering point in time $T_H$.

As illustrated by waveform 4G, the heavier mechanical loading on the motor results in a significantly higher load current with a trailing edge of the current pulse lagging the supply voltage by the phase angle $\theta$. It can be seen with regard to waveforms 4D and 4G that the phase angle $\theta$ is approximately equal, i.e., the power factor of the motor is optimized under varying mechanical loads.

The operation of the circuit of FIG. 1 as described above in conjunction with FIG. 4, relies on the phenomenon of an increasing amplitude of control voltage $V_F$ for a lightening or decreasing motor load and a decreasing amplitude of control voltage $V_F$ for an increasing mechanical load, such control voltage being generated by the freewheeling motor 20 during nonconduction periods of the Triac switch 60.

In view of the above discussion, it can be seen that the firing angle or delay angle between the zero crossing point of the supply voltage and the triggering of the Triac switch into a conducting condition is a function of mechanical loading on the rotating rotor shaft 22 of the motor 20. The circuit of FIG. 1 illustrates applicant's invention in its simplest form. However, in some applications of the present invention, it is desirable that full supply voltage be applied to the motor under very heavy mechanical loading on the motor 20. The circuit of FIG. 1 will not readily provide for full supply voltage application to the motor 20.

Figure 2:
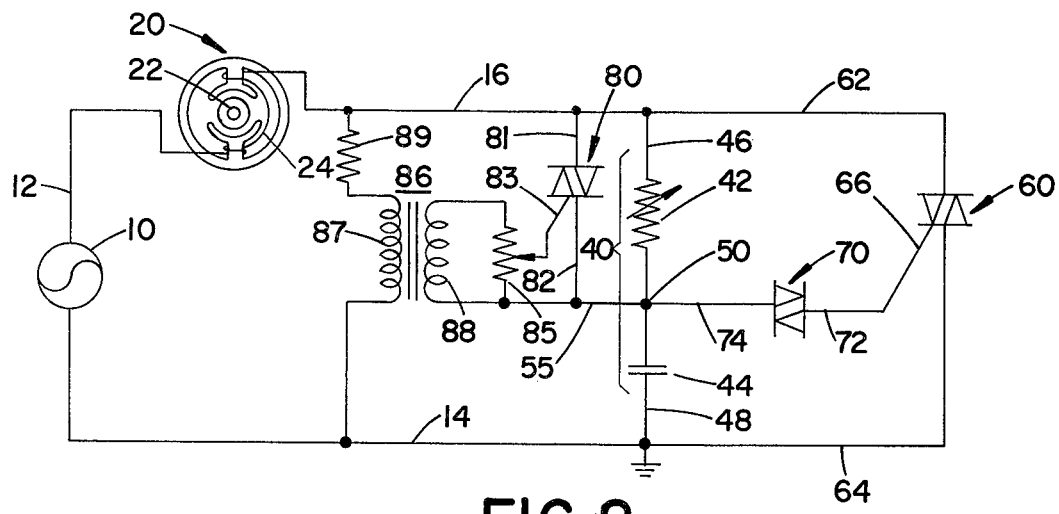
FIG. 2 is a schematic diagram of a circuit incorporating the present invention, such circuit including a first means to effect full supply voltage application to the illustrated induction motor under full load conditions.
Figure 3:
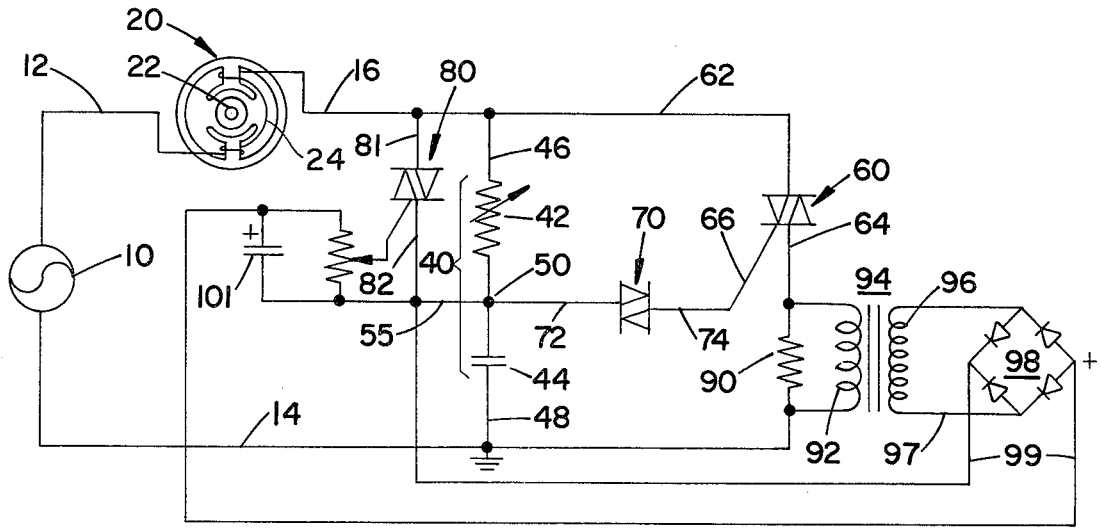
FIG. 3 is a schematic diagram of a circuit incorporating the present invention, such circuit including a second means to effect full supply voltage application to the illustrated induction motor under full load conditions.

Means to provide full supply voltage application (full power) to the motor 20 under very heavy mechanical load conditions is illustrated in FIGS. 2 and 3, wherein like elements relative to FIG. 1 carry like reference numerals.

In FIGS. 2 and 3, the supply 10, the motor 20, the Triac switch 60, the two-lead semiconductor Diac switch 70, the resistor 42, and the capacitor 44 function as described earlier with regard to FIG. 1 and the waveform illustrated in FIG. 4.

With particular reference to FIG. 2, to provide for full supply voltage application to the motor 20 under heavy mechanical loading, a voltage sensing transformer 86 is provided having a primary winding 87 and a secondary winding 88. The primary winding is connected in parallel across the series-connected supply 10 and the motor 20 via a primary winding current limit resistor 89 of, for example, 3.3 kilo ohms. The secondary winding 88 of the transformer 86 is paralleled by a triggering voltage generating potentiometer type resistor 85 having a variable voltage selecting tap connected to a gate electrode 83 as a full load triggering thyristor also illustrated in the preferred form of a Triac switch 80. A first full load triggering thyristor power lead 81 is connected to the second motor power input lead 16, while a second full load triggering thyristor power lead 82 is connected to the RC network midpoint 50 via an override voltage applying line 55. Further, the low side of the secondary winding 88 and its paralleling resistor 85 are also connected to the RC network midpoint 50 as illustrated via the override voltage applying line 55.

The operation of the transformer 86, the resistors 85, 89 and the Triac switch 80 will now be discussed. Upon an increase of mechanical loading of the motor 20, the voltage across the primary winding 87 during nonconduction periods of Triac switch 60 will increase, since the control voltage $V_F$ generated by the motor 20 decreases, as discussed and illustrated earlier with regard to FIGS. 1 and 4. The voltage across the primary winding 87 is at least a portion of the voltage across the RC network 40 comprised by resistor 42 and capacitor 44, the remainder of such voltage being dropped across the resistor 89. By properly adjusting the tap of the triggering voltage generating resistor 85, the Triac switch 80 can be made to fire at a predetermined load current amplitude through the motor 20 to apply an override voltage; i.e., to, in effect, short out resistor 42 and provide a direct charging path to the capacitor 44, which will rapidly charge and fire the Triac switch 60 into a conducting condition. It is further noted that the Triac switch 80 could be connected directly to gate electrode 66 to effect full load continuous triggering of the Triac switch 60. It is desirable that the overriding voltage supplied by line 55 connected to the RC network midpoint 50 be existent for a predetermined time generally at the zero crossing point of the supply voltage, since it is at this point that triggering of the Triac switch 60 is desirable to effect full half-cycle application of the supply voltage to the motor for maximum mechanical power output by the motor. When the motor becomes less heavily loaded, the voltage drop across the primary winding 87 will drop below a threshhold value and the Triac switch 80 will recover to a nonconducting state wherein the circuit of FIG. 2 operates in accordance with the teachings of the earlier-discussed FIG. 1.

FIG. 3 illustrates another method for applying full supply voltage to the motor under heavy mechanical load conditions. As illustrated by FIG. 3, a low ohmic value current sensing resistor 90 (e.g., 0.01 ohms) is connected in series with the supply 10, the motor 20, and the Triac switch 60, wherein load current circulating in the loop defined by such series-connected elements is sensed to generate a voltage drop across the resistor 90, which is impressed across the primary winding 92 of a load current sensing transformer 94. The load current sensing transformer 94 includes a voltage step-up secondary winding 96 having an AC output 97 fed to the AC input of a full wave rectifier illustrated in a preferred form of a four-diode bridge 98, well known in the art. The DC output side 99 of the bridge 98 provides a voltage across an overriding voltage generating capacitor 101 which electrically parallels the triggering voltage generating resistor 85 having its tap connected to the gate electrode 83 of the thyristor 80. It can be seen that for a predetermined voltage drop amplitude across the resistor 90 indicative of a predetermined load current amplitude, the capacitor 101 will charge to a DC voltage value required to fire the Triac switch 80 into a conducting condition, thereby rapidly charging the capacitor 44 as earlier discussed with regard to FIG. 2, which in turn triggers the motor energizing Triac switch 60 into a conducting condition. Since the RC time constant of the Triac switch 80 in series with the capacitor 44 is extremely short, the Triac switch 60 is triggered into a conducting condition generally at the zero crossing point of the supply voltage to provide full supply voltage application to the motor 20.

With regard to FIGS. 2 and 3, it can be seen that means are provided to override the automatic duty cycle type controlling of the Triac switch 60 by the RC network 40 when very heavy mechanical loads (e.g, more than 100% of rated load) are imposed on the motor 20, such loads requiring fully supply voltage application to the motor to maintain its speed and required torque. When the mechanical loading of the motor drops below a predetermined value, the Triac switch 80 of FIGS. 2 and 3 establishes and maintains a nonconducting condition once each half cycle wherein the circuits of FIGS. 2 and 3 operate in accordance with the teachings discussed with regard to FIGS. 1 and 4, i.e., the normal operating state of the circuit wherein the power factor of the motor is being continuously optimized as a function of the amplitude of the motor-generated control voltage $V_F$.

Finally, it is noted that conventional dv/dt suppression RC snubber networks can be added to the circuits of FIGS. 1–3 to electrically parallel the Triac switch 60 where commutation irregularities arise.

In accordance with the teachings above, a very simple method and means are provided for duty cycle regulating an induction motor to automatically optimize its power factor, thereby resulting in a considerable energy saving for induction motor applications. While the illustrated application of the invention has been directed to a single-phase circuit, the teachings of the present invention also apply to polyphase motor control circuits for larger horsepower induction motors.

Although preferred embodiments of this invention have been shown and described, it should be understood that various modifications and rearrangements of their elements may be resorted to without departing from the scope of the invention as disclosed and claimed herein.

What is claimed is:

1. A method of optimizing the power factor of a less than fully loaded generally constant speed AC induction motor by regulating the time duration of AC supply voltage application to the induction motor in electrical series relation with its AC supply and a gate-controlled, motor-energizing, semiconductor switch comprising the step of varying the time duration by varying the conduction period of the semiconductor switch in accordance with the amplitude of a control voltage generated by the generally constant speed motor during non-conduction periods of the semiconductor switch when the rotor of the motor is freewheeling, the amplitude of the control voltage varying as a function of mechanical loading on the rotating rotor shaft of the motor.

2. A method of optimizing the power factor of a less than fully loaded generally constant speed AC induction motor by regulating the time duration of AC supply voltage application to the induction motor in electrical series relation with its AC supply and a gate-controlled, motor-energizing, semiconductor switch comprising the steps of triggering the semiconductor switch into a conducting condition a predetermined time period subsequent to the preceding zero crossing point of the supply voltage, the semiconductor switch recovering to a non-conducting condition generally at the trailing edges of load current pulses through the generally constant speed motor; detecting a control voltage generated by the motor during the non-conducting periods of the semiconductor switch when the rotor of the motor is freewheeling, the control voltage amplitude varying in proportion to mechanical loading on the motor; and varying the predetermined time period between the zero crossing points of the supply voltage and the triggering points of the semiconductor switch as a function of the control voltage amplitude to automatically vary the duration of AC supply voltage application to the motor in proportion to the degree of mechanical loading on the rotating rotor shaft of the motor wherein the power factor of the motor is optimized.

3. A method according to claim 2, including the step of continuously triggering the semiconductor switch to latch it in a conducting condition, the continuous triggering occurring only when the load current through the motor exceeds a predetermined amplitude, such continuous triggering causing the application of full supply voltage to the motor.

4. A method according to claim 2, wherein said varying includes decreasing the conduction period of the semiconductor switch as the amplitude of the control voltage increases, the control voltage amplitude increasing as mechanical loading on the rotating rotor shaft of the motor decreases.

5. In a circuit including a generally constant speed induction motor periodically energized at a predetermined frequency by a power supply to maintain its speed under changing mechanical load conditions, means for varying the period of energization of the motor in accordance with a mechanical load indicative control signal parameter generated by the motor between its periods of energization, wherein the power factor of the motor is optimized over the range of changing mechanical loads.

6. In a circuit including a generally constant speed AC induction motor and an electronic controller for regulating power applied by an AC supply to the generally constant speed AC induction motor, the controller having a gate-controlled semiconductor AC switching means connected in electrical series relationship with the AC supply and the induction motor, power being applied to the motor via the AC switching means, and means for triggering the semiconductor switching means into a conducting condition subsequent to the preceding zero crossing point of the supply voltage to apply less than full supply voltage to the motor, the switching means switching to a non-conducting condition generally at the trailing edges of load current pulses through the motor, a triggering means control comprising means to vary the time period between the zero crossing points of the supply voltage and the triggering of the switching means into a conducting condition as a function of the amplitude of a feedback voltage generated by the motor during non-conduction periods of the semiconductor switch means when the rotor of the motor is freewheeling.

7. An electronic controller according to claim 6, including means to continuously trigger the switching means to latch it in a conducting condition when the amplitude of the load current pulses exceeds a predetermined value, wherein fully supply voltage is applied to the motor.

8. In an electronic controller for regulating power applied by an AC supply to a generally constant speed AC induction motor, the controller having a gate-controlled semiconductor AC switching means connected in electrical series relationship with the AC supply and the induction motor, power being applied to the motor via the AC switching means, and means for triggering the semiconductor switching means into a conducting condition subsequent to the preceding zero crossing point of the supply voltage to apply less than full supply voltage to the motor, the switching means switching to a nonconducting condition generally at the trailing edges of load current pulses through the motor, a triggering means control comprising means to vary the time period between the zero crossing points of the supply voltage and the triggering of the switching means into a conducting condition as a function of the amplitude of a feedback voltage generated by the generally constant speed motor during non-conduction periods of the semiconductor switch means when the rotor of the motor is freewheeling, said electronic controller including means to continuously trigger the switching means to latch it in a conducting condition when the amplitude of the load current pulses exceeds a predetermined value, wherein full supply voltage is applied to the motor, said means to constantly trigger including a low ohmic value current sensing resistor in electrical series relation with the motor, the amplitude of the voltage drop across the sampling resistor, in response to load current pulses therethrough, determining at what value of load current amplitude said continuous triggering is effected.

9. In a circuit including a generally constant speed AC induction motor, an electronic controller for regulating power applied by an AC supply to the generally constant speed AC induction motor comprising a gate-controlled thyristor switch connected in electrical series relationship with the AC supply and the induction motor, power being applied to the generally constant speed motor via the thyristor switch; means for triggering the thyristor switch into a conducting condition subsequent to the preceding zero crossing point of the supply voltage to apply less than full supply voltage to the motor, the means for triggering including an RC network connected in electrical parallel relation across the induction motor and the AC supply wherein the voltage across the RC network during non-conduction periods of the thyristor switch is equal to the difference of the supply voltage and a control voltage generated by the motor during the non-conduction period of the thyristor switch when the rotor of the motor is freewheeling, the amplitude of the motor-generated control voltage varying as a function of mechanical loading on the rotating shaft of the motor wherein the voltage across the RC network during non-conduction periods of the thyristor switch varies as a function of mechanical loading on the rotating shaft of the motor, an RC network-generated voltage being applied to the gate of the thyristor switch to switch it into a conducting condition when the amplitude of the RC network-generated voltage attains a predetermined amplitude.

10. An electronic controller according to claim 9, including a two-lead alternating current semiconductor switch having one of its leads connected to the gate of the thyristor switch and having its other lead connected to the RC network, the two-lead alternating current semiconductor switch breaking down into a fully conducting condition at the predetermined amplitude of the RC network-generated voltage applied to the said other lead wherein the thyristor switch is triggered into conduction.

11. An electronic controller for regulating power applied by an AC supply to a generally constant speed AC induction motor comprising a gate-controlled thyristor switch connected in electrical series relationship with the AC supply and the generally constant speed induction motor, power being applied to the motor via the thyristor switch; means for triggering the thyristor switch into a conducting condition subsequent to the preceding zero crossing point of the supply voltage to apply less than full supply voltage to the motor, the means for triggering including an RC network connected in electrical parallel relation across the induction motor and the AC supply wherein the voltage across the RC network during non-conduction periods of the thyristor switch is equal to the difference of the supply voltage and a control voltage generated by the motor during the non-conduction period of the thyristor switch when the rotor of the motor is freewheeling, the amplitude of the motor-generated control voltage varying as a function of mechanical loading on the rotating shaft of the motor wherein the voltage across the RC network during nonconduction periods of the thyristor switch varies as a function of mechanical loading on the rotating shaft of the motor, an RC network-generated voltage being applied to the gate of the thyristor switch to switch it into a conducting condition when the amplitude of the RC network-generated voltage attains a predetermined amplitude, said electronic controller including a two-lead alternating current semiconductor switch having one of its leads connected to the gate of the thyristor switch and having its other lead connected to the RC network, the two-lead alternating current semiconductor switch breaking down into a fully conducting condition at the predetermined amplitude of the RC network-generated voltage applied to the said other lead wherein the thyristor switch is triggered into conduction, said electronic controller further including means to apply to said other lead an override voltage in excess of the predetermined amplitude of the RC network-generated voltage when the load current through the motor exceeds a predetermined amplitude, wherein the thyristor switch is latched in a conducting condition to effect the application of full supply voltage.

12. An electronic controller according to claim 11, wherein the override voltage is existent at least for a predetermined time period generally at the zero crossing points of the supply voltage.

13. An electronic controller according to claim 11, wherein the means to supply the override voltage to said other lead include a transformer having a primary winding and a secondary winding, the primary winding being connected to sense at least a portion of the voltage across the RC network during non-conduction periods of the thyristor switch, the induced secondary winding voltage amplitude constituting a triggering means for effecting the application of the override voltage to the other lead of the two-lead semiconductor switch.

14. An electronic controller according to claim 11, wherein the means to supply the override voltage to said other lead includes a low ohmic value current sensing resistor in series with the motor, a transformer having a primary winding and a secondary winding, the primary winding being connected in elecrical parallel relation across the current sensing resistor, a full wave rectifier having an AC input and a DC output, the AC input of the full wave rectifier being connected to the secondary winding of the transformer, and a capacitor means connected to the DC output of the full wave rectifier, the capacitor means charging to a voltage amplitude proportional to the amplitude of load current through the motor as sensed by the current sampling resistor, the voltage amplitude of the charged capacitor means constituting a triggering means for effecting the application of override voltage to the other lead of the two-lead semiconductor switch.

15. An electronic controller according to claims 13 or 14, wherein the means to supply the override voltage to said other lead further includes another thyristor switch having a pair of power leads and a gate electrode, one of said power leads being connected to said other lead, the other power lead being connected to a source providing the override voltage, the gate electrode being connected to effect triggering of said another thyristor switch into a conducting condition in response to the triggering means.

* * * * *